SEMICONDUCTOR PULSE WIDTH MODULATOR

Filed March 25, 1958 2 Sheets-Sheet 1

INVENTOR.
BALTHASAR H. PINCKAERS
BY Omund R. Dahle
ATTORNEY

Aug. 2, 1960 B. H. PINCKAERS 2,947,950

SEMICONDUCTOR PULSE WIDTH MODULATOR

Filed March 25, 1958 2 Sheets-Sheet 2

INVENTOR.
BALTHASAR H. PINCKAERS

BY Omund R. Dahle

ATTORNEY

United States Patent Office 2,947,950

Patented Aug. 2, 1960

2,947,950

SEMICONDUCTOR PULSE WIDTH MODULATOR

Balthasar H. Pinckaers, Edina, Minn., assignor to Minneapolis-Honeywell Regulator Company, Minneapolis, Minn., a corporation of Delaware Filed Mar. 25, 1958, Ser. No. 723,768

8 Claims. (Cl. 332—9)

This invention relates to new and novel semiconductor control circuits for controlling energization to a load device in proportion to a signal by means of pulse width modulation. More specifically the invention relates to providing a novel pulse width modulator circuit in which proportional energization of a load is accomplished by applying thereto pulses of energy of equal amplitude, and in which the control signal is effective to vary the pulse width thereby varying the percentage of time during which the load is fully energized.

It is an object of this invention therefore to provide a new and improved semiconductor control circuit in which variable power is supplied to a load device by pulse width modulation in which the pulse width is proportional to a signal.

This and other objects of this invention will become more apparent upon consideration of the claims, specification and drawings of which:

Figure 1:
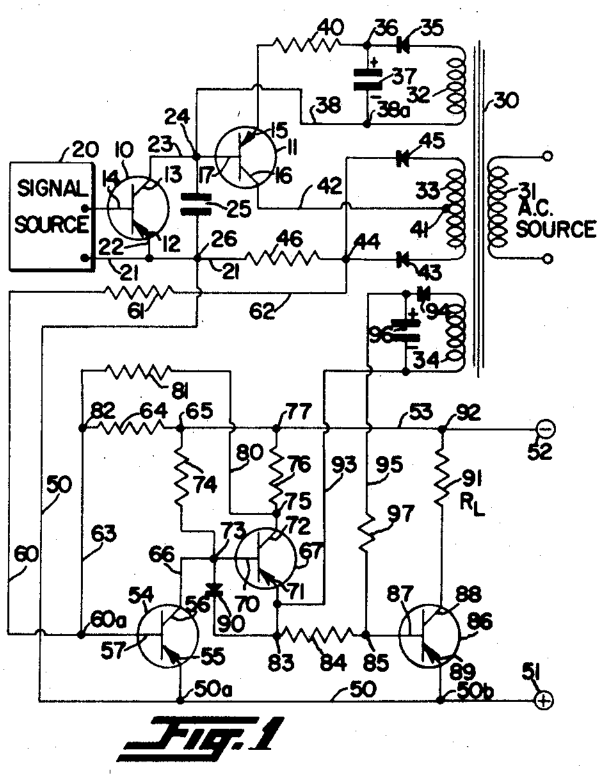
Figure 1 is a schematic representation of an embodiment of the invention.

Referring now to Figure 1, there is disclosed a pair of transistors 10 and 11. Transistor 10 has an emitter electrode 12, a collector electrode 13 and a base electrode 14. Transistor 11 has an emitter electrode 15, a collector electrode 16 and a base electrode 17. These transistors are shown as junction triode transistors, however, the invention is not limited to the use of this type transistor. A signal source 20, which may be of a suitable type to produce an output current which is a function of a condition to be controlled, has a pair of output terminals, the first of which is directly connected to the base electrode 14 of transistor 10 and the other of which is connected by conductors 21 and 22 to the emitter electrode 12 of transistor 10.

The collector electrode 13 of transistor 10 is directly connected by means of a conductor 23, and a junction 24 to the base electrode 17 of the transistor 11. A capacitor 25 is connected between the junction 24 and a junction 26 on the conductor 21, whereby the capacitor is connected directly across the collector and emitter electrodes of transistor 10.

There is also disclosed in Figure 1 a transformer 30 having a primary winding 31 and secondary windings 32, 33 and 34. The primary winding 31 is adapted to be connected to a suitable source of alternating current power, not shown. The upper terminal of secondary winding 32 is connected to a first terminal of a rectifying diode 35 the other terminal of which is connected to a junction 36. The lower terminal of winding 32 is connected to a conductor 38. A filter capacitor 37 is connected between the junction 36 and a junction **38*a* on the conductor 38, thereby providing a first D.C. source. The junction 36 is connected through a relatively large current limiting resistor 40 to the emitter electrode 15 of the transistor 11. The conductor 38 is connected to the junction 24 and thus to the base electrode 17 of the transistor 11. The winding 32, the rectifier 35, the capacitor 37 and the resistor 40 form a constant current source which is applied across the emitter-base electrodes of the transistor 11**.

The secondary winding 33 has an upper and lower terminal and a center tap 41, which center tap is directly connected to the collector electrode 16 of transistor 11 by a conductor 42. The lower terminal of the winding 33 is connected through a rectifying diode 43 to a junction 44, and the upper terminal of the winding 33 is connected by means of a rectifying diode 45 to the junction 44. The junction 44 is connected by means of a resistor 46 to the conductor 21 and the emitter 12.

The junction 26 on conductor 21 is connected by a conductor 50 to the positive terminal 51 of a source of D.C. potential, not shown. The negative terminal 52 of the source is connected to a conductor 53. A junction transistor 54 which has an emitter electrode 55, a collector electrode 56 and a base electrode 57, has its emitter electrode 55 directly connected to the conductor 50 at a junction **50*a*. The base electrode 57 is connected by a conductor 60, a resistor 61, and a conductor 62 to the junction 44. A biasing circuit for the transistor 54 can be traced from the base electrode 57 to a junction 60*a* on the conductor 60, through a conductor 63, and a resistor 64 to a junction 65 on the negative conductor 53. The collector electrode 56 of transistor 54 is directly connected by a conductor 66 to the base electrode of a transistor 67. Transistor 67 has a plurality of electrodes including base electrode 70, an emitter electrode 71 and a collector electrode 72. A junction 73 on the conductor 66 is connected through a collector load resistor 74 to the negative conductor 53 at junction 65. The collector electrode 72 of transistor 67 is connected by means of a junction 75 and a resistor 76 to the negative conductor 53 at a junction 77. A regenerative feedback path may be traced from the collector of transistor 67 to the base of transistor 54, which path includes the junction 75, a conductor 80, a resistor 81 to a junction 82 on the conductor 63, and through the conductors 63 and 60 to the base electrode 57. The transistors 54 and 67** form a snap-acting switching circuit.

The emitter electrode 71 of transistor 67 is connected by a junction 83, a resistor 84, and a junction 85 to a base electrode 87 of a transistor 86, which transistor also includes a collector electrode 88 and an emitter electrode 89. A rectifying diode 90 is connected between the junction 73 and 83 and thus is connected from the base to the emitter of transistor 67. The collector electrode 88 of transistor 86 is connected through a suitable load device 91, here shown as a resistive element, to the negative conductor 53 at a junction 92. The emitter electrode 89 is directly connected to the positive conductor 50 at a junction **50*b*. The conductor 93 connects the lower terminal of secondary winding 34 of transformer 30 to the junction 83. The upper terminal of the secondary winding 34 is connected through a rectifying diode 94, a conductor 95 and a current limiting resistor 97 to the junction 85 located between the resistor 84 and the base electrode 87. A filter capacitor 96 is connected across the conductors 93 and 95**.

Figure 3:
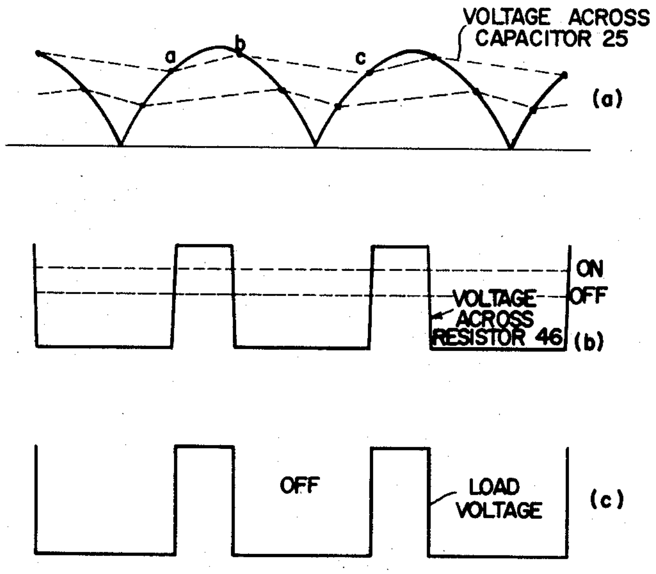
Figures 3 and 4 show representative wave shapes at various points of the circuit to aid in explanation of the operation.

In considering the operation of the circuit, it may be considered as operating substantially in the following manner. The alternating current source energizes the power transformer 30 and the voltage induced on winding 33 is rectified by the rectifying diodes 43 and 45 to provide a positive full wave rectified potential at junction 44 with respect to the conductor 42. A current path may be traced from the terminals of the secondary winding 33 through the rectifying diodes to junction 44, through the resistor 46 and the capacitor 25 to charge the capacitor, from base 17 to collector 16 of transistor 11 and through the conductor 42 to the center tap of the winding 33. This current flowing through the capacitor 25 is effective to charge the capacitor, substantially as is shown in Figure 3*a*.

The secondary winding 32 of transformer 30, the rectifying diode 35, the filter capacitor 37 and the current limiting resistor 40 constitute a constant current source and a current path may be traced from the upper terminal of winding 32 through the diode 35 and the resistor 40, through the transistor 11 from emitter 15 to base 17 and back through conductor 38 to the lower terminal of the winding 32. The resistor 40 should be large with respect to the input impedance of the transistor 11 so that the input impedance of the transistor is not a controlling factor in this circuit. The time constant of the resistor 40 and the filter capacitor 37 is such that a substantially constant bias current flows in this circuit throughout the entire cycle.

The output impedance of the transistor 11 between the base 17 and the collector 16 limits the charging current flowing in the capacitor 25 to a constant value in accordance with the constant bias current to the transistor 11. Transistor 11 as shown is connected in the common base configuration. Thus whenever the supply voltage from the winding 33 exceeds the voltage of capacitor 25, a charging current flows through the capacitor 25 and the transistor 11. Since this charging current is maintained nearly constant during the time it exists, the voltage across the capacitor increases nearly linearly with time.

It will be noted that the output electrodes, that is, the collector and emitter electrodes of transistor 10 are directly connected across the terminals of capacitor 25 and thus the voltage charge across the capacitor is the supply voltage for the transistor 10. The emitter to collector current flow in the transistor 10 is dependent upon the input current flowing in the emitter-base circuit from the signal source 20. The signal source 20 may be for example a condition responsive device which provides a D.C. output potential having a magnitude dependent upon the condition being sensed. Thus it can be seen that the capacitor 25 is charged by a constant current having a magnitude equal to the collector current of transistor 11 minus the collector current of the transistor 10 and is discharged by a constant current flowing through the transistor 10. Since the charging and discharging current of capacitor 25 are constant it follows that the voltage across the capacitor must increase and decrease linearly with time. This is shown in Figure 3*a*. If the current from the signal source 20 is varied in a direction to increase the conductivity of transistor 10 so that the collector current of transistor 10 is increased by a given amount, it follows that the actual capacitor charging current decreases by an equal amount. Thus, the charging current has become smaller in magnitude and the discharge current of the capacitor has increased in magnitude, with the result that the voltage across the capacitor 25 becomes less and the interval of time during which the capacitor charges is increased. The lower dashed curve of Figure 3*a* shows this case where the charging time is increased and the charging rate is decreased. The collector current of transistor 11 can thus be made to exist for longer time intervals by increasing the current flowing in transistor 10.

During the period in which collector current is flowing in transistor 11 a voltage drop appears across the resistor 46 as is shown in Figure 3*b*. This curve is also representative of the current wave form through the resistor, capacitor 25 and transistor 11. This voltage is designed to be of such a magnitude that it will cause operation of the switching circuit or bistable circuit comprising transistors 54 and 67. Under static conditions transistor 54 is conductive and transistor 67 is cut off. When the square wave potential appears across the resistor 46 it is applied across the base-emitter electrodes of transistor 54 to render the transistor 54 less conductive. As transistor 54 becomes less conductive the voltage appearing across the collector load resistor 74 is reduced and the transistor 67 begins to conduct. As transistor 67 begins to conduct the collector current causes a voltage drop across the resistor 76 such that junction 75 moves in a positive going direction. This positive going potential is applied through the regenerative feedback resistor 81 to the base electrode 57 of transistor 54 to further cut off transistor 54, which further increases the conductivity of transistor 67. This action is regenerative and the circuit snaps from a condition with transistor 54 conductive to one in which transistor 67 is conductive and transistor 54 is cut off. Immediately upon the voltage disappearing across the resistor 46 the snap acting circuit reverts to its static condition.

Transistor 86 is in the nature of a follower stage of transistor 67 to provide power amplification to energize the load device 91. It will be noted that the emitter current of transistor 67 flow in the base junction of transistor 86 so that the output current of transistor 86 is an amplifier replica of the current flowing in transistor 67. The D.C. power supply comprising the secondary winding 34 of transformer 30, the rectifier 94 and the capacitor 86 provide a D.C. bias across the resistor 84 which is of a polarity to maintain the transistor 86 fully cut off during the static condition, even over wide ranges of operating temperatures. The potential across the resistor 84 tends to cause a current to flow in a current path which may be traced from the junction 85 into the base electrode 87, the emitter electrode 89, the conductor 50, through the presently conductive transistor 54 from emiter 55 to collector 56, through conductor 66 to junction 73, through diode 90 which by-passes the base-emitter junction of transistor 67 and back to the resistor 84 at junction 83. The diode 90 which by-passes the base-emitter junction of transistor 67 causes the base 70 to be positive with respect to the emitter 71 but places the majority of the bias potential developed across the resistor 84 across the base-emitter junction of transistor 86. It is thus apparent that in the static condition when the transistors 67 and 86 are cut off, the bias potential across resistor 84, from the bias supply, maintains the base electrodes 70 and 87 positive with respect to their emitter electrodes 71 and 89, respectively.

Figure 2A:
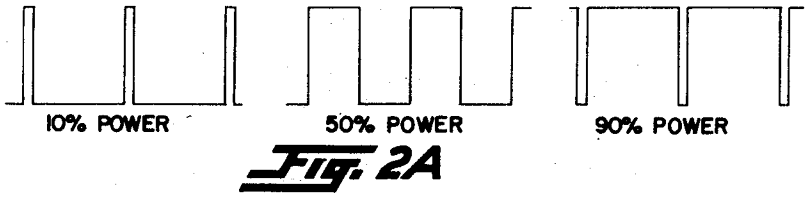
Figure 2*a* shows the wave shape of power applied to the load.
Figure 2:
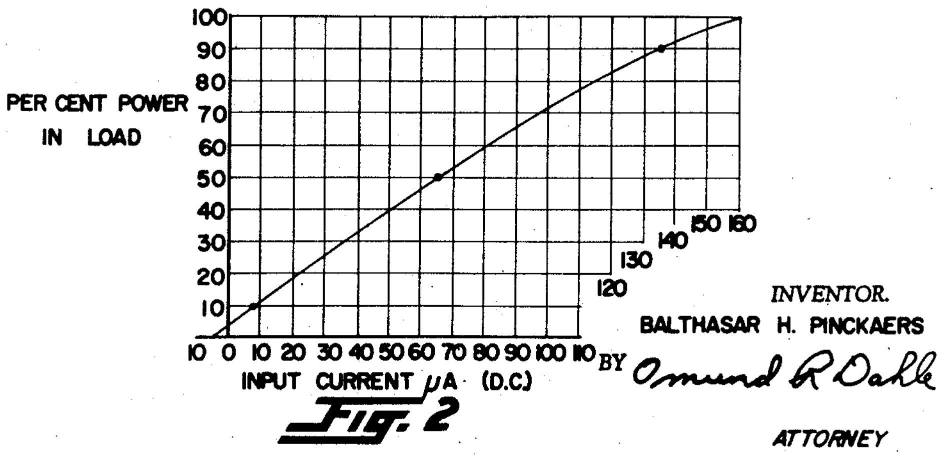
Figure 2 shows graphically the relation between power output (pulse width) and input current.

Figure 2 shows the relation between the signal input current to transistor 10 from the signal source 20 and the output power to the load device 91. In the example as shown a 160 micro-ampere change in input current modulates the power to the load from 0 to 100%. Figure 2*a* shows graphically the wave shape of power applied to the load device 91, the three wave shapes in Figure 2*a* being taken from representative points of the curve of Figure 2.

Figure 4:
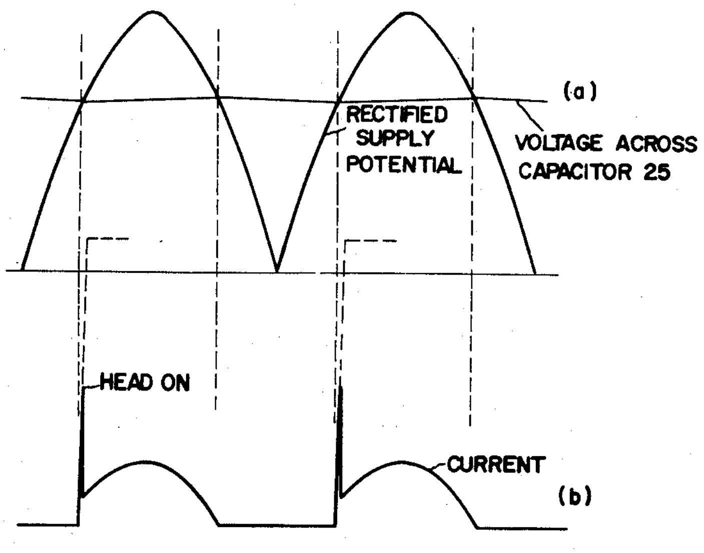

The sensitivity of the circuit may be increased by a slight modification of the circuit of Figure 1. If the resistor 46 is removed from the circuit and the resistor 61 shorted out the power to the load can be modulated from 0 to 100% with less than twenty micro-ampere change in the input current from the signal source 20. This appears to be due to the fact that when the bi-stable circuit switches on to energize the load 91, the transistor 54 is cut off, and a high impedance then appears in the charging circuit of capacitor 25, which causes the charging current and the collector current of transistor 11 to be abruptly reduced to a lower value. With resistor 46 removed from the circuit the charging current for capacitor 25 may be traced from the junction 44 through the conductors 62 and 60, through the low impedance of the now conductive transistor 54 from base 57 to emitter 55, through conductor 50 and junction 26 to the capacitor 25. Figure 4*b* shows in greater detail the wave form of the collector current of transistor 11 after the load is energized. It will be noted from Figure 4 that as the rectified supply potential exceeds the voltage on the capacitor, the charging current rises rapidly as is also the case previously discussed and shown in Figure 3*b*. However, in the present case when the current rises to the point that the bistable circuit switches and transistor 54 abruptly becomes non-conductive, a discontinuity appears in the charging current, Figure 4*b*, and the charging current is thereafter limited to the leakage current in the base-emitter junction of transistor 54.

In one successful embodiment of the circuit of Figure 1 the following components were utilized:

| | | |
|---|---|---|
| Resistor **40** | ohms | 4700 |
| Resistor **46** | do | 100 |
| Resistor **61** | do | 1000 |
| Resistor **64** | K ohms | 120 |
| Resistor **74** | ohms | 9100 |
| Resistor **76** | do | 1000 |
| Resistor **81** | K ohms | 150 |
| Resistor **85** | ohms | 82 |
| Capacitor **25** | mfd | 10 |
| Capacitor **37** | mfd | 25 |
| Capacitor **96** | mfd | 25 |
| Transistors **10** and **11** | T.I. | 300 |
| Transistor **67** | T.I. | 300 |
| Transistor **54** | | 2N109 |
| Transistor **86** | | H6 |

Changes and modifications of this invention will undoubtedly occur to those who are skilled in the art and I therefore wish it to be understood that I intend to be limited by the scope of the appended claims and not by the specific embodiment of my invention which is disclosed herein for the purpose of illustration only.

I claim:

1. Pulse width modulator apparatus for providing variable power to load apparatus by varying the power pulse-width as a function of a signal comprising: full wave rectifying means having input and output terminals, said input terminals being connected to a source of alternating current, said rectifying means providing at said output terminals a full wave rectified potential; capacitor means; first circuit means connecting said capacitor means to said rectifier means output terminals whereby said capacitor means is charged to a potential approaching the peak value of said rectified potential, said charging current flowing whenever the magnitude of said rectified potential exceeds the potential charge on said capacitor means; current limiting means forming a portion of said circuit means, said current limiting means being effective to maintain a substantially constant charging current flowing into said capacitor means during said charging periods, said current limiting means comprising a first transistor having a constant current source connected between the emitter and base electrodes of said transistor to thereby limit the magnitude of the collector current flowing in said transistor to a relatively constant value; direct current signal producing means; further circuit means controlled by said signal producing means for discharging said capacitor means at a constant magnitude current of discharge, the magnitude of said constant current being a function of said direct current signal; and resistive load means connected into said first circuit means, said load means being actuated by said charging current.

2. Semiconductor control apparatus comprising: a pulsating direct current potential source having first and second output connections, current limiting means comprising a transistor having a plurality of electrodes including an emitter electrode, a collector electrode, and a control electrode, said current limiting means further comprising a constant current source connected between the emitter and control electrodes of said transistor, the allowable current flow in said collector electrode thereby being limited to a constant maximum value; capacitor storage means; resistive load means; means connecting said capacitor means, said resistive load means and said transistor means in a series circuit loop to said direct current potential source whereby the current from said source flows through said load means, said transistor means and said capacitor means to charge said capacitor means; capacitor discharging means comprising second transistor means, having a plurality of electrodes including a collector electrode, an emitter electrode and a control electrode, the collector electrode and one of the other of said electrodes comprising output electrodes, said output electrodes being connected directly across said capacitor storage means; a direct current signal source, said source being connected to the emitter and control electrode of said second transistor means, the magnitude of the signal being effective to control the relative conductivity of said second transistor means to thereby control the discharge current flowing from said capacitor storage means through said second transistor means, the magnitude of said signal being effective to vary the ratio of the charging time to the discharging of said capacitor storage means.

3. Semiconductor control apparatus comprising: capacitor means having first and second terminals; a source of alternating current; full-wave rectifying means connected to said source and providing a pulsating full-wave rectified potential therefrom at a pair of supply terminals; first semiconductor amplifying means having a plurality of electrodes including first and second output electrodes and a control electrode; constant current producing means; circuit means connecting said constant current producing means to said first semiconductor means control electrode and to one of the other of said electrodes; means connecting the first semiconductor means first output electrode to one of said pair of supply terminals; means connecting said first semiconductor means second output electrode to said first capacitor terminal; load means connecting the second capacitor terminal to the other of said supply terminals, whereupon during each potential pulsation a capacitor charging current is caused to flow from said supply terminal through said first semiconductor means to charge said capacitor with a substantially constant current during the interval the magnitude of the supply potential pulsations exceed the potential stored on said capacitor means; capacitor discharging means comprising second semiconductor amplifying means having a plurality of electrodes including output and control electrodes, said second semiconductor means having its output electrodes connected across said capacitor means, and direct current bias means connected to said second semiconductor amplifying means control electrode to cause a substantially constant current to flow through said second semiconductor amplifying means to tend to discharge said capacitor means at a constant rate.

4. Semiconductor control apparatus comprising: a pulsating direct current potential source having first and second output connections; capacitor storage means; resistive load means, current regulating means; means connecting said capacitor means, said resistive load means and said current regulating means in a series circuit loop to said pulsating direct current potential source, said current regulating means comprising a transistor having a plurality of electrodes including an emitter electrode, a collector electrode, and a control electrode, said current regulating means further comprising a constant current source connected between the emitter and control electrodes of said transistor, the current flowing in said collector electrode thereby being regulated to a substantially constant value whereby a regulated and substantially constant current from said source flows through said current regulating means, said load means, and said capacitor means to charge said capacitor means during intervals when the magnitude of the pulsating direct current potential exceeds the potential charge on said capacitor means; capacitor discharging means comprising second transistor means having a plurality of electrodes including a collector electrode, an emitter electrode and a control electrode, the collector electrode and one of the other of said electrodes comprising output electrodes, said output electrodes being connected directly across said capacitor storage means; a direct current signal source, said source being connected to the emitter and control electrode of said second transistor means, the magnitude of the signal being effective to control the relative conductivity of said second transistor means to thereby control the discharge current flowing from said capacitor storage means through said second transistor means; the magnitude of said signal being effective to vary the ratio of the charging time to the discharging of said capacitor storage means.

5. Semiconductor control apparatus comprising: a unidirectional pulsating direct current potential source having first and second output connections; capacitor storage means; resistive load means; means for maintaining a constant current comprising a transistor having a plurality of electrodes including an input electrode, an output electrode, and a control electrode, said means for maintaining a constant current further comprising a constant current source connected between the input electrote and the control electrode of said transistor, the allowable current flow in said output electrode thereby being limited to a constant maximum value; means connecting said capacitor means, said resistive load means and said means for maintaining a constant current in a series circuit loop to said pulsating direct current potential source whereby whenever the magnitude of the pulsating direct current potential source exceeds the potential charge on said capacitor means a charging current from said source flows through said load means, said capacitor means and means for maintaining a constant current to charge said capacitor storage means; capacitor discharging means comprising second transistor means, having a plurality of electrodes including a collector electrode, an emitter electrode and a control electrode, the collector electrode and one of the other of said electrodes comprising output electrodes, said output electrodes being connected directly across said capacitor storage means, a signal source connected to the emitter and control electrode of said second transistor means, the magnitude of the signal being effective to control the relative conductivity of said second transistor means to thereby control the discharge current flowing from said capacitor storage means through said second transistor means; the magnitude of said signal being effective to vary the ratio of the charging time to the discharging of said capacitor storage means.

6. Pulse width modulator apparatus for providing variable power to load apparatus by varying the power pulse-width as a function of a signal comprising: a pulsating direct current potential source having first and second output terminals; capacitor means; first circuit means connecting said capacitor means to said pulsating direct current potential source first and second output terminals whereby said capacitor means is charged to a potential approaching the peak value of said pulsating potential source, said charging current flowing during the intervals when the magnitude of said potential exceeds the potential charge on said capacitor means; current limiting means forming a portion of said circuit means, said current limiting means being effective to maintain a substantially constant charging current flowing into said capacitor means during said charging intervals, said current limiting means comprising a first transistor having a constant current source connected between the emitter and base electrodes of said transistor to thereby limit the magnitude of the collector current flowing in said transistor to a relatively constant value; direct current signal producing means; further circuit means controlled by said signal producing means for discharging said capacitor means at a constant rate, the magnitude of the constant current being a function of said direct current signal; and resistive load means connected into said first circuit means, said load means being actuated by said charging current.

7. Pulse width modulator apparatus for providing variable power to load apparatus by varying the power pulse-width as a function of a signal comprising: a pulsating direct current potential source having output terminals; capacitor means; first circuit means connecting said capacitor means to said pulsating direct current source output terminals whereby said capacitor means is charged to a potential approaching the peak value of said pulsating direct current potential, said charging current flowing during periods whenever the magnitude of said pulsating potential exceeds the potential charge on said capacitor means; current limiting means forming a portion of said circuit means, said current limiting means being effective to maintain a substantially constant charging current flowing into said capacitor means during said charging periods, said current limiting means comprising a first transistor having a constant current source connected between the emitter and base electrodes of said transistor to thereby limit the magnitude of the collector current flowing in said transistor to a relatively constant value; direct current signal producing means; controllable impedance means for causing a substantially constant discharging current to flow out of said capacitor means, said controllable impedance means comprising a second transistor having a plurality of electrodes including a collector, an emitter and a base electrode, the collector and emitter electrodes being directly connected across said capacitor means, and the base and emitter of said transistor being directly connected to said direct current signal, the magnitude of said constant capacitor discharge current being a function of said direct current signal whereby the ratio of the charging time to the discharging time of said capacitor means is controlled as a function of said signal; and resistive load means connected into said circuit means, said load means being actuated by said charging current.

8. Pulse width control apparatus for providing variable power to load apparatus by controlling the power pulse width as a function of a signal comprising: means for producing a series of unidirectional current pulses, the individual pulses having a wave shape which changes in magnitude as a function of time, said means having a pair of output supply terminals; capacitive storage means; load means; circuit means including said load means connecting said capacitive storage means to said output supply terminals, said direct current potential pulsations causing a current to flow from one to the other of said supply terminals through said circuit means to charge said capacitive storage means during the intervals the magnitude of the supply current pulsations exceed the potential on said capacitive storage means, said current also being effective to control the excitation of said load; current limiting means comprising transistor means forming a part of said circuit means for maintaining said charging current at a relatively constant value during said charging intervals; signal producing means; further circuit means comprising second transistor means controlled by said signal producing means for effecting discharge of said capacitive storage means at a constant magnitude current of discharge, the magnitude of said discharging current being a function of the signal magnitude, said signal being effective to control the average potential existing on said capacitive storage means to thereby control the time duration of the charging pulses so that the pulse width of the signal to the output means is controlled as a function of said signal producing means.

References Cited in the file of this patent

UNITED STATES PATENTS 2,435,496 Guanella et al. ---------- Feb. 3, 1948